Richard A. Wallers
INVENTOR.

BY Beehler & Arant
Attorney

United States Patent Office 3,377,105
Patented Apr. 9, 1968

3,377,105
PROTECTIVE OVERHEAD SHIELD FOR TUNNELING MACHINE AND METHOD
Richard A. Wallers, Newport Beach, Calif., assignor to Smith Industries International, Inc., Compton, Calif.
Filed Mar. 7, 1966, Ser. No. 532,331
9 Claims. (Cl. 299—11)

ABSTRACT OF THE DISCLOSURE

A tunneling machine including a main carriage having extendible shoes for supporting it from the tunnel wall, a wheel-type cutting head having a drive shaft, an elongated cutter carriage which rotatably supports the cutter drive shaft and is in turn supported in a longitudinally slidable relationship to the main carriage, separate front and rear anchors for the cutter carriage, a power drive for drivingly rotating the cutter wheel, a longitudinal thrust drive means coupled between the main carriage and the cutter carriage for selectively either driving the cutter carriage forward relative to the main carriage or pulling the main carriage forward relative to the cutter carriage, an erector arm disposed forwardly of the main carriage and rotatable about the forward portion of the cutter carriage for installing tunnel liner segments at selected angular positions on the tunnel wall, and a removable shield located above the erector arm for protecting the area surrounding the erector arm from falling debris.

---

Figure 1:
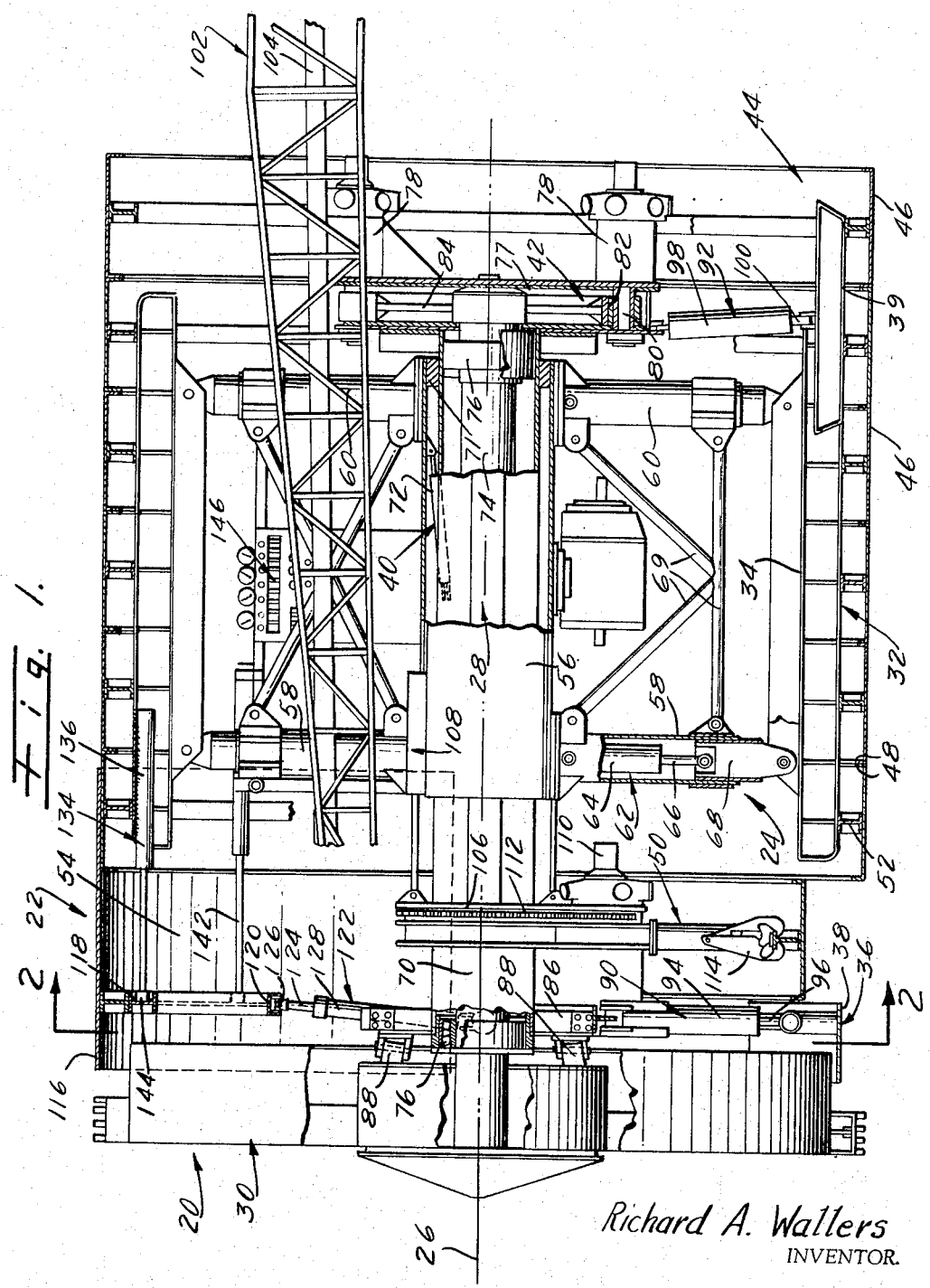

This invention relates generally to earth boring machines and has more particular reference to improvements in tunnel drills.

A typical tunnel drill comprises a main carriage supporting an axially driven cutter carriage which mounts a forward rotary cutter. During a tunneling operation, the main carriage is anchored in position in the tunnel and the cutter carriage is driven forwardly in a feed stroke relative to the main carriage to urge the rotating cutter against the tunnel face. When the cutter carriage reaches the forward limit of its feed stroke, the main carriage is driven forwardly in a repositioning stroke relative to the cuter carriage and reanchored, after which the cutter carriage is again driven forwardly in a feed stroke relative to the main carriage. This procedure of anchoring the main carriage, driving the cutter carriage forwardly in a feed stroke, and repositioning the main carriage is repeated until the tunnel has been driven the desired distance.

In most tunneling operations, the tunnel is lined to prevent cave-in of the tunnel wall and to shield the workers and the floor of the tunnel against falling rock, dirt, and the like. Generally, additional sections of tunnel liner are installed in the region between the extended cutter and the main carriage following each feed stroke of the tunnel drill so that the tunnel lining extends almost to the tunnel face at all times. In some cases, the tunnel lining consists of cylindrically curved sections of steel plate which are bolted to one another in such a way as to form a steel shell within the tunnel. In other cases, the tunnel lining consists of spaced annular I-beams which are joined by timbers whose ends are positioned between the flanges of adjacent I-beams. In order to facilitate installation of the tunnel lining, most tunnel drills are equipped with erector means for elevating the liner sections to and supporting the sections in position while they are being installed. One existing tunnel drill, for example, is equipped with an erector arm which is rotatably mounted on the cutter carriage, between the rotary cutter and the main carriage, for swinging about the rotation axis of the cutter. This erector arm has gripping means at its outer end for gripping a section of tunnel liner and is rotatable to position and support the section for installation behind the cutter when the cutter carriage has been driven to the forward limit of its feed stroke.

The existing tunnel drills of the kind under discussion possess one deficiency which this invention seeks to overcome. Thus, during each feed stroke of the cutter carriage, the bare tunnel wall is exposed in the region between the leading end of the previously installed tunnel liner and the advancing cutter. As a consequence, rock, dirt, and the like can drop from the tunnel ceiling through the space between the cutter and the front end of the main carriage. Also, the tunnel ceiling is unsupported in the region between the advancing cutter and the leading end of the installed tunnel liner during each feed stroke of the cutter carriage so that there always exists the possibility of cave-in of the tunnel ceiling in this region. As a consequence, the workmen who install the additional sections of tunnel liner behind the cutter at the conclusion of each feed stroke of the existing tunnel drills are exposed to the serious hazard of being struck by falling rock from the bare tunnel ceiling behind the cutter.

The present invention overcomes this deficiency of the prior tunnel drills. To this end, the invention provides a tunnel drill equipped with a cylindrically curved shield which is co-axially disposed behind and travels forwardly with the cutter during each feed stroke of the cutter carriage. This shield is so axially dimensioned that the rear end of the shield overlaps the leading end of the previously installed tunnel liner and the forward end of the shield is located just to the rear of the cutting plane of the cutter. Accordingly, the shield provides, in effect, a temporary tunnel liner which bridges the gap between the advancing cutter and the leading end of the installed tunnel liner during each feed stroke of the cutter, thereby to shield the space between the cutter and the main carriage against falling rock, dirt, and other debris. According to a further features of the invention, the shield is vertically supported by rams which may be extended to urge the shield upwardly against the tunnel cei ing, thus to support the ceiling against cave-in in the region between the advancing cutter and the installed tunnel liner. The shield is uniquely constructed to clear the erector means on the tunnel drill so as to permit additional sections of tunnel liner to be installed below the liner at the conclusion of each feed stroke of the tunnel drill.

During operation of the present tunnel drill, then, the main carriage of the machine is positioned within the leading end of the previously installed tunnel liner and is anchored to the liner in the usual way. The cutter and shield of the machine are then driven forwardly in a feed stroke to drive the cutter into the earth formation behind the tunnel face. When the cutter reaches the forward limit of its feed stroke, additional sections of tunnel liner are installed below the now extended shield, between the cutter and the main carriage, while the shield is urged upwardly against the tunnel ceiling to support the latter against cave-in. Thereafter, the main carriage is driven forwardly to a new position in the leading end of the newly installed tunnel liner and the cycle is repeated. Thus, the workmen who install the additional liner sections at the conclusion of each feed stroke are protected against falling rock from the tunnel ceiling in advance of the previously installed tunnel liner by the forwardly extended shield of the present tunnel drill.

Accordingly, it is a general object of this invention to provide improvements in tunnel drills of the character described.

A more specific object of the invention is to provide an improved tunnel drill embodying a novel traveling shield which furnishes a temporary tunnel liner in the region between the cutter and main carriage of the drill during each forward feed stroke of the cutter, thereby to shield the space between the cutter and carriage against rock, dirt, and other debris falling from the tunnel wall.

Another object of the invention is to provide an improved tunnel drill of the character described wherein the traveling shield may be urged upwardly against the tunnel wall to prevent cave-in of the wall between the cutter and the leading end of the previously installed tunnel liner.

A further object of the invention is to provide an improved tunnel drill of the character described wherein the traveling shield is uniquely constructed to clear the erector means of the drill, thereby to permit installation of additional sections of tunnel liner below the shield, in the region between the cutter and main carriage of the drill, when the cutter is extended to the forward limit of its feed stroke.

A highly important object of the invention related to the foregoing object is to provide an improved tunnel drill of the character described wherein the shield of the drill protects the workmen who install the liner sections at the conclusion of each feed stroke against falling rock from the exposed tunnel ceiling in advance of the previously installed tunnel liner.

A further object of the invention is to provide an improved tunnel drill of the character described wherein the traveling shield is relatively simple in construction, economical to manufacture, reliable in operation, does not interfere with normal operation of the drill or its progression through the earth formation, and is otherwise ideally suited to its intended purposes.

Other objects, advantages, and features of the invention will become readily evident as the description proceeds.

With these and such other objects in view, the invention consists in the construction, arrangement, and combination of the various parts of the invention, thereby the objects contemplated are attained, as hereinafter set forth, pointed out in the appended claims, and illustrated in the accompanying drawings.

Figure 2:
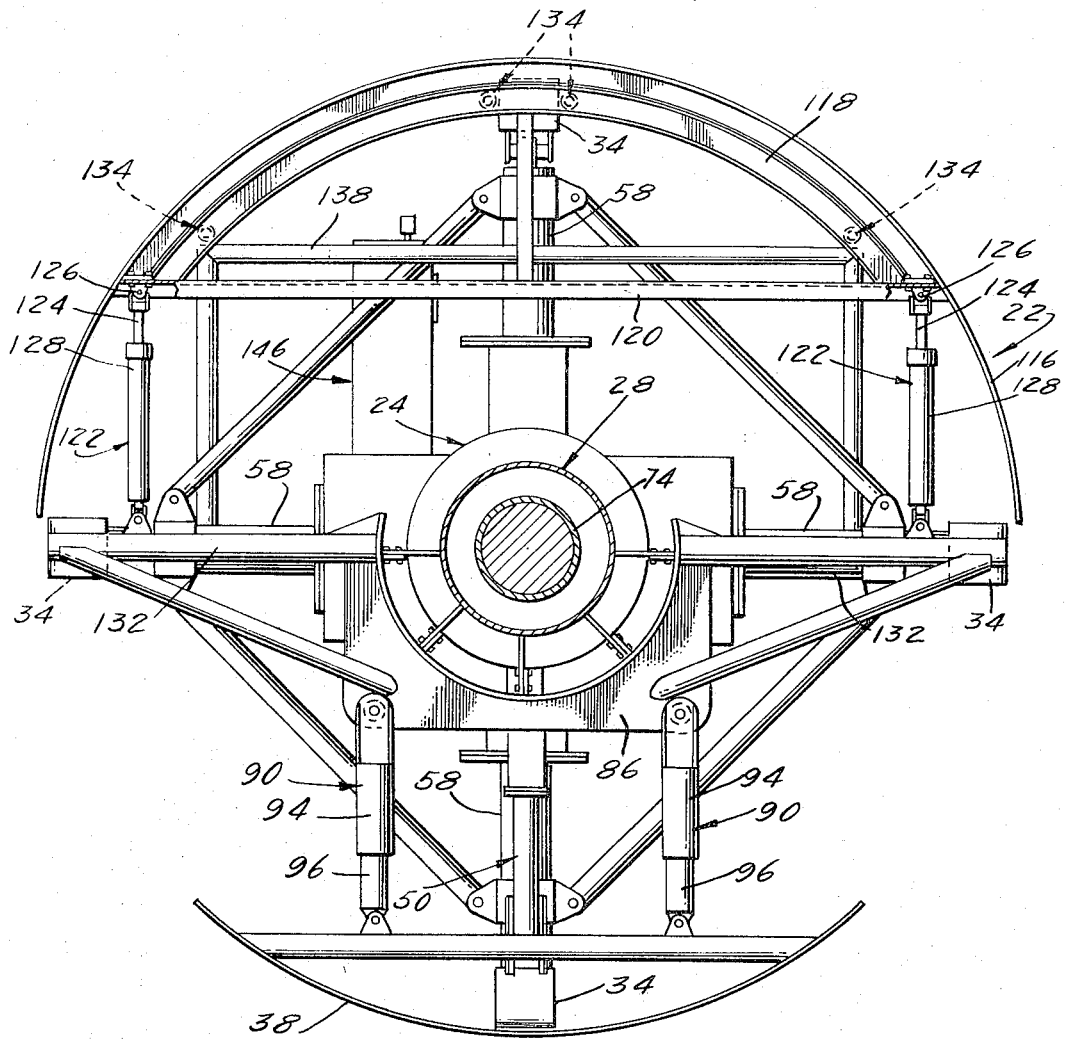

In these drawings:

FIGURE 1 is a vertical longitudinal section through an improved tunnel drill according to the invention; and FIGURE 2 is a section taken on line 2—2 in FIGURE 1.

Referring now to these drawings, there is illustrated a tunnel drill 20 embodying a traveling shield 22 according to the invention. Tunnel drill 20, except for the shield 22, is conventional. Accordingly, the basic structure of the drill will be described only in sufficient detail to enable a full and complete understanding of the invention. With this in mind, tunnel drill 20 will be observed to comprise a main carriage 24 having a longitudinal axis 26. Supported on the main carriage 24 for movement lengthwise of the axis 26 is a cutter carriage 28. The front end of this cutter carriage extends forwardly of the main carriage. Mounted on the front end of the cutter carriage 28 is a rotary cutter 30 which turns on an axis generally parallel to approximately coincident with the longitudinal axis 26 of the main carriage. Mounted on the main carriage 24 are anchor means 32 for anchoring the main carriage in a fixed position in a tunnel being drilled. Anchor means 32 include wall anchor shoes 34 which are movable laterally of the main carriage between outer extended positions, wherein these shoes are disposed to anchor the main carriage against axial movement, and inner retracted positions, wherein the anchor shoes are disposed to release the main carriage for axial movement. Mounted on the cutter carriage 28 are anchor means 36 for anchoring the cutter carriage in a fixed position in a tunnel being drilled. Anchor means 36 include wall anchor shoes 38 and 39 which are movable laterally of the cutter carriage between outer extended positions, wherein these shoes are disposed to anchor the cutter carriage against axial movement, and inner retracted positions, wherein the latter shoes are disposed to release the cutter carriage for axial movement. Operatively connected between the main carriage 24 and the cutter carriage 28 are drive means 40 for driving the carriages in relative axial movement. The rear end of the cutter carriage extends rearwardly of the main carriage and mounts additional drive means 42 for driving the cutter 30 in rotation.

As noted earlier, and as is well known to those skilled in the art, a tunnel is commonly lined as it is driven forwardly through the earth in order to reinforce the tunnel wall against cave-in and shield the tunnel bore, as well as the workers and equipment therein, against falling rock, dirt, and other debris. This tunnel lining may be constructed in various ways but commonly consists of either annular I-beams which are joined by timbers whose ends are positioned between the flanges of adjacent beams or cylindrically curved steel plates which are bolted to one another in such a way as to form a cylindrical casing adjacent the tunnel wall. The tunnel liner 44 illustrated in the drawings is of this latter type. Thus, tunnel liner 44 comprises a number of generally rectangular, cylindrically curved steel plates 46 bounded by inwardly directed parametrical flanges 48 which are bolted to one another. Tunnel drill 20 is equipped with an erector means or arms 50 for elevating the liner plates 46 to and supporting the plates in position while these plates are being fastened to one another and to the adjacent, previously installed liner plates. Welded to the inner surface of each liner plate 46 is a curved I-beam 52 which extends circumferentially of the plate to reinforce the latter and provide a member for engagement by the erector arm 50.

Briefly, in operation of the tunnel drill 20, the main carriage 24 of the drill is positioned adjacent the leading end of the tunnel liner 44 and the main carriage anchor shoes 34 are extended outwardly into engagement with the I-beams 52 on the tunnel liner plates 46 to firmly anchor the main carriage in a fixed position in the tunnel being drilled. The cutter carriage anchor shoes 38 and 39 are retracted to release the cutter carriage 28 for axial movement relative to the main carriage. Thereafter, the cutter drive means 42 are operated to drive the cutter 30 in rotation and the carriage drive means 40 are operated to drive the cutter carriage 28 forwardly in a feed stroke relative to the main carriage. During this forward feed stroke of the cutter carriage, the rotating cutter 30 is urged against the tunnel face. When the cutter carriage 28 reaches he forward limit of its feed stroke, additional liner plates 46 are bolted to the leading end of the tunnel liner 44, to extend the liner to a position adjacent the tunnel face. Thereafter, the cutter carriage anchor shoes 38 and 39 are extended outwardly to firmly anchor the cutter carriage 28 in a fixed position in the tunnel, and the main carriage anchor shoes 34 are retracted to release the main carriage 24 for axial movement relative to the cutter carriage. The carriage drive means 40 are then operated to drive the main carriage 24 forwardly in a repositioning stroke relative to the cutter carriage, to a new position adjacent the leading end of the now extended tunnel liner 44. Finally the main carriage anchor shoes 34 are again extended outwardly into engagement with the tunnel liner 44 to reanchor the main carriage 24 in a fixed position in a tunnel and the cutter carriage 28 is again driven forwardly in a feed stroke relative to the main carriage. This procedure of periodically anchoring the main carriage 24 to the tunnel liner 44, driving the cutter carriage 28 forwardly in a feed stroke relative to the main carriage, installation of additional liner plates 46 at the leading end of the tunnel liner, and advancing of the main carriage to a new position adjacent the leading end of the extended liner is repeated until the tunnel has been driven the desired distance.

The tunnel drill 20 described thus far is conventional except for the traveling shield 22. This conventional tunnel drill is deficient for the reason that during each forward feed stroke of the cutter carriage 28, the bare wall of the tunnel is exposed in the region 54 between the advancing cutter 30 of the drill and the leading end of the previously installed tunnel liner 44. Accordingly, dirt, rock, and other debris can drop from the tunnel wall in the region 54 into the space between the main carriage 24 and cutter 30 of the tunnel drill. Moreover, the tunnel wall is unsupported in the region 54 and is thus prone to cave-in. According to the present invention, this deficiency of the conventional tunnel drill is avoided by the provision of the shield 22. This shield is driven forwardly in unison with the cutter 30 during each forward feed stroke of the cutter carriage 28 and is axially dimensioned to bridge the gap between the cutter and the leading end of the tunnel liner 44. Accordingly, the shield 22 provides a temporary tunnel liner which shields the region 54 between the cutter and the permanent liner 44 against falling rock, dirt, and other debris from the exposed tunnel wall in this region. Moreover, as noted earlier and hereinafter described in detail, the shield 22 may be urged upwardly against the tunnel wall in the region 54 to support the wall against cave-in while additional tunnel liner plates 46 are being installed at the conclusion of each feed stroke of the cutter carriage.

Referring now in somewhat greater detail to the tunnel drill 20, the main carriage 24 of the drill will be observed to comprise a tubular casing 56 which is open at its front and rear ends. The main carriage anchor means 32 comprise four front guide cylinders 58 spaced about and rigidly secured at their inner ends to the front end of the main carriage casing 56 and four rear guide cylinders 60 spaced about and rigidly secured at their inner ends to the rear end of the casing. The four front cylinders and the four rear cylinders are spaced 90° apart, and the corresponding front and rear cylinders are aligned axially of the casing 56. Coaxially positioned within each guide cylinder 58 and 60 is a hydraulic ram 62 (only one shown). The inner end of each ram cylinder 64 is attached to the main carriage 24. The outer end of each ram piston rod 66 is attached to a plunger 68 which slides in the outer end of the corresponding guide cylinder 58, 60. Plungers 68 extend beyond the outer ends of the guide cylinders and are pivotally attached to the adjacent ends of the adjacent main carriage anchor shoes 34, respectively. It is evident at this point, therefore, that the rams 62 are effective to drive the anchor shoes 34 between their extended and retracted positions, referred to earlier. The adjacent front and rear guide cylinders 58, 60 are interconnected by reinforcing braces 69.

The cutter carriage 28 comprises a tubular casing 70 which is slideably keyed by bearing means 71 (only one shown) within the main carriage casing 56 in such a way that the casings 56, 70 are permitted to move axially relative to one another but are restrained against relative rotation. The carriage drive means 40 comprise hydraulic rams 72 which are contained within the main carriage casing 56 and are operatively connected between the latter casing and the cutter carriage casing 70. Rams 72, therefore, are effective to drive the casings 56, 70 in relative axial movement.

Extending coaxially through the casing 70 of the cutter carriage 28 is a drive shaft 74. Drive shaft 74 is rotatably supported at its ends in the cutter carriage casing 70 by means of combined radial and thrust bearings 76. The front end of the drive shaft 74 extends beyond the front end of the casing 70 and is coaxially secured to the cutter 30. The rear end of the drive shaft extends beyond the rear end of the casing 70. The cutter drive means 42 comprises a housing 77 rigid on the rear end of the cutter carriage casing and mounting a number of rotary hydraulic motor 78. Each motor 78 has an output shaft 80 mounting a pinion 82 within the housing 76. Pinions 82 mesh with a large ring gear 84 rigid on the rear end of the cutter drive shaft 74. Shaft 74 and cutter 30 are thus driven in rotation by the motors 78. Fixed to the front end of the cutter carriage casing 70 is a bracket 86 which supports the drilling shield 22 in the manner hereinafter explained. The front side of this bracket mounts a number of thrust bearings 88 for supporting the drilling thrust on the cutter 30.

The cutter carriage anchor means 36 comprise two front hydraulic rams 90 and three rear hydraulic rams 92 which extend below the cutter carriage casing 70, at opposite sides of its longitudinal centerline. The cylinders 94 of the front rams 90 are secured at their inner ends to the bracket 86. The outer ends of the ram piston rods 96 are pivotally attached to the front cutter carriage anchor shoes 38. The inner ends of the cylinders 98 of the rear rams 92 are attached to the cutter carriage housing 77. The outer ends of the ram piston rods 100 are pivotally attached to the rear cutter carriage anchor shoes 39. The rams and anchor shoes of the cutter carriage anchor means 36 are disposed to support the tunnel drill during each forward repositioning stroke of the main carriage 24 relative to the cutter carriage 28.

Extending endwise of the tunnel drill 20, just above the main carriage 24 and cutter carriage 28, is a cuttings conveyor 102. This conveyor is supported on the cutter carriage for axial movement therewith. The front end (not shown) of the conveyor is located adjacent the cutter 30 in a position wherein the leading end of the conveyor belt 104 is disposed to receive cuttings from the cutter as the latter is driven in rotation against the face of the tunnel. The rear end of the conveyor is located a distance beyond the rear end of the tunnel drill in a position wherein the conveyor belt 104 is disposed to discharge the cuttings to an appropriate receiver (not shown).

The inner end of the erector arm 50 is rotatably mounted on a supporting carriage 106 for turning about the rotation axis of the cutter 30. The erector arm carriage 106, in turn, is slideably supported on the casing 70 of the cutter carriage 28, between the main carriage 24 and the cutter 30, for movement along the casing 70. Operatively connected between the main carriage 24 and the erector arm carriage 106 are hydraulic rams 108 for axially positioning the latter carriage along the cutter carriage. Mounted on the erector arm carriage 106 is a rotary hydraulic motor 110 which is driveably coupled, through gearing 112, to the erector arm. Motor 110, therefore, is effective to drive the erector arm in rotation about the cutter carriage 28 and to angularly position the arm with respect to the latter carriage. Carried on the outer end of the erector arm are hydraulically actuated gripping means 114 which may be extended and retracted radially of the carriages and operated to grip the I-beams 52 of the tunnel liner plates 46. As noted earlier, and hereinafter explained in greater detail, the erector arm 50 is utilized at the conclusion of each feed stroke of the tunnel drill 20 to support tunnel liner plates in position while they are being bolted to the leading end of the tunnel liner 44.

The present drilling shield 22 comprises a generally semi-cylindrical metal plate 116 which extends about the upper half of the cutter 30. This plate is coaxially disposed relative to the cutter and has an external radius of curvature approximating or just slightly less than the cutting radius of the cutter. Secured to the inner surface of the plate, adjacent its front edge, is a curved reinforcing beam 118. The ends of beam 118 are rigidly joined by a reinforcing channel 120 which extends diametrically across the underside of the plate. Additional reinforcing members extend vertically between the beam and channel, as shown. Shield 22 is supported on the forward cutter carriage bracket 86 by a piar of upright hydraulic rams 122. The upper ends of the piston rods 124 of these rams are secured, by pivot joints 126, to the outward ends of the shield reinforcing channel 120. The lower ends of the ram cylinders 128 are secured, by pivot joints 130, to the outer ends of outrigger arms 132 rigid on the bracket. The pivot joints 126, 130 comprise compound pivot connections having horizontal pivot axes extending, respectively, parallel to and normal to the longitudinal axis 26 of the tunnel drill. It is evident at this point, therefore, that the rams 122 are effective to vertically move the drilling shield 22 relative to the cutter carriage 28. The pivot axes 126, 130 permit relative axial and lateral movement of the shield and cutter carriage.

Operatively connected between the drilling shield 22 and the main carriage 24 of the tunnel drill 20 are four hydraulic rams 134 which extend generally parallel to the longitudinal axis 26 of the drill. The cylinders 136 of two of these rams are located over the front end of the main carriage casing 56 and are rigidly attached to opposite sides of the upper main carriage anchor shoe 34. The cylinders 136 of the two remaining rams 134 are rigidly attached to a frame 138 rigid on the main carriage 24. The front ends of the ram piston rods 142 are secured to the web of the shield beam 118 by lost motion joints 144 which permit limited vertical and horizontal lateral movement of the shield 22 relative to the rods 142. It is now evident, therefore, that the hydraulic rams 134 are effective to drive the drilling shield 22 axially relative to the main carriage 24 while permitting vertical movement of the shield by the hydraulic rams 122.

The several hydraulic motors and rams of the tunnel drill 20 are supplied with operating fluid under pressure from a hydraulic fluid source (not shown). The direction and rate of movement of the motors and rams are controlled from a central panel 146 on the machine having a number of central valves (not shown) for this purpose.

In describing the operation of the tunnel drill 20, it will be assumed that the tunnel has been started and lined, by the liner 44, to a position adjacent the tunnel face and that the main carriage 24 of the tunnel drill is located adjacent to the leading end of the liner. At this time, the drilling shield 22 and cutter carriage 28 are retracted to their rear limiting positions relative to the main carriage. The erector arm 50 is retracted to a position adjacent the front end of the main carriage. The tunnel drill is conditioned for operation by supplying hydraulic fluid to the main carriage anchor rams 62 for extending the main carriage anchor shoes 34 outwardly into anchoring engagement with the tunnel liner 44. Hydraulic fluid is supplied to the rams 62 in such a way as to center the main carriage 24 in the tunnel liner 44. After the main carriage has thus been firmly anchored to the tunnel liner, hydraulic fluid under pressure is supplied to the carriage drive rams 72 in the direction to drive the cutter carriage 28 forwardly relative to the main carriage 24 and to the cutter drive motors 78. The drilling cutter 30 is thereby driven in rotation and axially forward against the tunnel face. Simultaneously, hydraulic fluid under pressure is supplied to the drilling shield drive rams 134 in a direction to drive the drilling shield 22 forwardly with the advancing cutter. The shield is retained in close proximity to or in pressured contact with the exposed tunnel wall or ceiling in advance of the tunnel liner 44 by supplying hydraulic fluid to the upright shield supporting rams 122. The flow of hydraulic fluid to the shield drive rams 134 is controlled in such a way that the shield moves forwardly in unison with the advancing cutter 30 and the leading end of the shield is constantly located just rearwardly of the cutting plane of the cutter; that is to say, just rearwardly of the circumferential cutting teeth on the cutter. At this point, it is significant to note that the drilling shield 22 is so axially dimensioned that the rear end of the shield overlaps the leading end of the installed tunnel liner during the entire forward feed stroke of the cutter 30. Accordingly, the shield provides, in effect, a temporary tunnel liner in the region 54 between the advancing cutter 30 and the leading end of the installed liner which shields this region against falling rock, dirt, and other debris. Also, the shield serves to reinforce the upper wall of the tunnel against cave-in in this region.

When the cutter 30 reaches the forward limit of its feed stroke, the supply of hydraulic fluid to the cutter drive motors 78 is terminated to stop the cutter. Thereafter, additional sections of tunnel liner plate 46 are installed in the region between the now extended cutter 30 and the leading end of the previously installed tunnel liner 44. This installation of the additional tunnel liner plates is facilitated by the erector arm 50 which supports the plates in position while they are being bolted to the leading end of the installed liner. In this regard, it is significant to note that the drilling shield reinforcing beam 118 and channel 120 and the shield supporting rams 122 are located adjacent the forward edge of the shield in order to provide sufficient clearance between these parts and the leading end of the tunnel liner 44 to accommodate the erector arm 50 and the additional tunnel liner plates 46 when the drilling shield is extended to the forward limit of its travel. When thus installing the additional tunnel liner plates 46 at the leading end of the tunnel liner 44, the hydraulic gripping means 114 on the outer end of the erector arm are operated to grip the plate I-beams 52, as shown, after which the arm is rotated upwardly to locate the plates in the proper position for attachment to the leading end of the tunnel liner. Those liner plates which are installed about the upper half of the tunnel are gripped adjacent one end in order to permit these plates to be rotated upwardly to a position between the extended drilling shield 22 and the extended piston rods 142 of the shield drive rams 134. During this operation of the erector arms 50, the latter is properly axially positioned along the cutter carriage 28 by the erector arm positioning rams 108. As noted earlier, a primary and highly important benefit of the drilling shield 22 resides in the fact that the shield protects the workmen who install the additional liner plates at the conclusion of each feed stroke against falling rock from the exposed ceiling of the tunnel in the region between the extended cutter and the previously installed tunnel liner.

After installation of the additional tunnel liner plates 46, the erector arm 50 is retracted to a position adjacent the front end of the main carriage 24. Hydraulic fluid under pressure is then supplied to the cutter carriage anchor rams 90, 92 to extend the cutter carriage anchor shoes 38, 39 outwardly into supporting engagement with the wall of the tunnel and the liner 44, respectively. Thereafter, hydraulic fluid is supplied to the main carriage anchor rams 62 to retract the main carriage anchor shoes 34 out of supporting engagement with the tunnel liner 44, thus to release the main carriage 24 for axial movement relative to the cutter carriage. The main carriage is then advanced forwardly to a new position adjacent the leading end of the extended tunnel liner 44 by supplying hydraulic fluid under pressure to the carriage drive rams 72. During this forward movement of the main carriage 24, the drilling shield 22 is retained in pressured contact with the upper wall of the tunnel by supplying hydraulic fluid to the drilling shield supporting rams 122. Accordingly, the drilling shield remains stationary with the cutter 30 during forward movement of the main carriage 24 to its new position adjacent the leading end of the tunnel liner. When the main carriage reaches this position, the main carriage anchor shoes 34 are again extended outwardly into anchoring engagement with the tunnel liner and the cutter carriage anchor shoes 38, 39 are retratced, thereby to release the cutter carriage for forward axial movement relative to the main carriage. The above operating cycle of the tunnel drill 20 is repeated until the tunnel has been driven the desired distance.

Referring to FIGURE 2, it will be observed that the present drilling shield 22 has a circumferential length approximating 180°. In the actual practice, it was found that the optimum circumferential shield length is just slightly less than 180° for the reason that binding or wedging of the shield in the tunnel is avoided.

It is now evident, therefore, that the invention herein described and illustrated in fully capable of attaining the several objects and advantages preliminarily set forth.

While the invention has been described in considerable detail in order to comply with the patent laws requiring a full public disclosure of at least one of its forms, such detailed description is not intended in any way to limit the broad features of principles of the invention or the scope of patent monopoly to be granted.

What is claimed as new in support of Letters Patent is:

1. In a tunnel drill including a main carriage having a longitudinal axis, a cutter carriage mounted on said main carriage for axial movement relative to said main carrige and having a front end located beyond the front end of said main carriage, a rotary cutter mounted on the front end of said cutter carriage for turning on a rotation axis parallel to said longitudinal axis and having peripheral cutting means disposed at a given cutting radius relative to said rotation axis, means for driving said cutter in rotation, and means for driving said carriages in relative axial movement, the improvements comprising:
    a cylindrically curved shield co-axially disposed relative to and located directly behind said cutter, said shield having a circumferential length approximating 180° and extending about the upper half of said cutter;
    the external radius of curvature of said shield approximating said cutting radius;
    said shield having a normal operative position relative to said cutter wherein the leading end of said shield is located directly to the rear of said cutting means;
    means supporting said shield on one of said carriages for axial movement of said shield with said cutter carriage and relative to said main carriage;
    means for driving said shield forwardly in unison with said cutter carriage and relative to said main carriage in such manner as to retain said shield in said normal operative position relative to said cutter;
    and an erector arm having gripping means at one end and rotatably mounted at the other end on said cutter carriage between said main carriage and cutter for turning on an axis parallel to said longitudinal axis, said erector arm being adapted to grip a section of tunnel liner and rotate said section to a position below said shield.

2. A tunneling machine as claimed in claim 1 which further includes separate front and rear anchors associated with said cutter carriage, said front anchor being disposed forwardly of said erector arm and extending downwardly so as to support the forward end of said cutter carriage and also said shield but without interfering with the placement of a section of tunnel liner by said erector arm.

3. In a tunneling machine, the combination comprising:
    a rotary cutter-head having a central drive shaft;
    a main carriage;
    means for supporting said cutter-head and said main carriage independently of each other above the tunnel lower wall;
    driving means for rotatably driving said cutter-head, and also for selectively advancing said cutter-head relative to said main carriage, or vice versa;
    a curved shield having an outer radius substantially the same as that of said cutter-head, and having a circumferential length of not more than 180°, said shield being disposed adjacent the tunnel upper wall with its leading edge to the rear of said cutter head so as to protect the area between said cutter head and main carriage;
    and independent drive means for normally driving said shield forwardly in a movement synchronous with the movement of said cutter-head, but selectively operable for causing said shield to move limited distances both vertically and axially relative to its normal position.

4. In a tunnel drill including a main carriage having a longitudinal axis, a cutter carriage mounted on said main carriage for axial movement relative to said main carriage and having a front end located beyond the front end of said main carriage, a rotary cutter mounted on the front end of said cutter carriage for turning on a rotation axis parallel to said longitudinal axis and having peripheral cutting means disposed at a given cutting radius relative to said rotation axis, means for driving said cutter in rotation, and means for driving said carriages in relative axial movement, the improvements comprising:
    a cylindrically curved shield co-axially disposed relative to and located directly behind said cutter, said shield having a circumferential length approximating 180° and extending about the upper half of said cutter;
    the external radius of curvature of said shield approximating said cutting radius;
    said shield having a normal operative position relative to said cutter wherein the leading end of said shield is located directly to the rear of said cutting means;
    means supporting said shield on one of said carriages for axial movement of said shield with said cutter carriage and relative to said main carriage, comprising first power means supporting said shield on said cutter carriage for limited axial movement relative to said cutter carriage and adapted to drive said shield vertically relative to said cutter carriage; and
    means for driving said shield forwardly in unison with said cutter carriage and relative to said main carriage in such manner as to retain said shield in said normal operative position relative to said cutter, said shield drive means comprising second power means operatively connected between said shield and main carriage for driving said shield axially.

5. A tunneling machine as claimed in claim 4 wherein said first power means comprises first normally upright hydraulic ram means extending between said shield and cutter carriage and pivotally connected to said shield and cutter carriage on pivot axes extending transversely of said longitudinal axis, thereby to permit limited axial movement of said shield relative to said cutter carriage, said ram means being adapted to drive said shield vertically relative to said cutter carriage; and wherein said second power means comprises second hydraulic ram means extending between said shield and main carriage generally parallel to said longitudinal axis for driving said shield axially while permitting vertical movement of said shield by said first ram means.

6. A tunneling machine as claimed in claim 4 wherein said first power means comprises first normally upright hydraulic rams extending between said cutter carriage at the ends, respectively, of said shield, means pivotally connecting said rams to said shield and cutter carriage, respectively, on pivot axes extending transversely of said longitudinal axis, whereby to permit limited axial movement of said shield relative to said cutter carriage, said rams being adapted to drive said shield vertically relative to said cutter carriage; and wherein said second power means comprises second hydraulic rams extending between said shield and main carriage generally parallel to said longitudinal axis for driving said shield axially while permitting vertical movement of said shield by said first rams.

7. A tunnel machine as claimed in claim 4 wherein said first power means comprises first normally upright hydraulic rams extending between said cutter carriage and the ends, respectively, of said shield, means pivotally connecting said rams to said shield and cutter carriage, respectively, on pivot axes extending transversely of said longitudinal axis, thereby to permit limited axial movement of said shield relative to said cutter carriage, said rams being adapted to drive said shield vertically relative to said cutter carriage; and wherein said second power means comprises second hydraulic rams extending between said shield and main carriage generally parallel to said longitudinal axis for driving said shield axially while permitting vertical movement of said shield by said first ram; and which additionally includes an erector arm having gripping means at one end and rotatably mounted at the other end on said cutter carriage between said main carriage and said cutter for turning on an axis parallel to said longitudinal axis, said erector arm being adapted to grip a section of tunnel liner and rotate said section to a position below said shield.

8. The method of drilling a tunnel which comprises the steps of:
  installing a circumferential liner within said tunnel to a position wherein the leading end of said liner is located adjacent the tunnel face;
  advancing a rotating cutter axially against said tunnel face;
  selecting a drilling shield having an internal radius of curvature which is approximately equal to the external radius of curvature of said liner, and having a circumferential length which is no greater than 180°;
  positioning said shield in close proximity to the upper half of the tunnel wall in the region between said cutter and the leading end of said liner in such manner that the forward end of said shield is located to the rear of said cutter and the rear end of said shield overlaps the leading end of said liner;
  and driving said shield forwardly in unison with said cutter to shield said region against falling dirt and rock.

9. The method according to claim 8 including the further step of:
  urging said shield upwardly into supporting contact with the tunnel wall within said region, thereby to reinforce the tunnel wall within said region against cave-in.

References Cited

UNITED STATES PATENTS

| | | | |
|---|---|---|---|
| 3,247,675 | 4/1966 | Winberg | 61—85 X |
| 3,309,142 | 3/1967 | Winberg | 299—33 |

FOREIGN PATENTS

| | | |
|---|---|---|
| 84,525 | 12/1894 | Germany. |
| 894,206 | 4/1962 | Great Britain. |
| 945,981 | 7/1956 | Germany. |

ERNEST R. PURSER, *Primary Examiner.*